(12) United States Patent
DeLisle

(10) Patent No.: US 7,111,829 B2
(45) Date of Patent: *Sep. 26, 2006

(54) ANTI-DETONATION FUEL DELIVERY SYSTEM

(75) Inventor: Gilles L. DeLisle, Las Cruces, NM (US)

(73) Assignee: Better Burn, LLC, Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/508,371

(22) PCT Filed: Mar. 19, 2003

(86) PCT No.: PCT/US03/08635

§ 371 (c)(1),
(2), (4) Date: Sep. 17, 2004

(87) PCT Pub. No.: WO03/081015

PCT Pub. Date: Oct. 2, 2003

(65) Prior Publication Data

US 2005/0230854 A1 Oct. 20, 2005

(51) Int. Cl.
*F02M 19/03* (2006.01)

(52) U.S. Cl. .................... 261/78.1; 123/478; 261/79.1; 261/81; 261/89; 261/DIG. 55

(58) Field of Classification Search ............... 261/76, 261/78.1, 78.2, 79.1, 79.2, 81, 89, DIG. 55, 261/DIG. 75, DIG. 83, 66; 366/340; 123/478
See application file for complete search history.

(56) References Cited

U.S. PATENT DOCUMENTS

| | | | | |
|---|---|---|---|---|
| 1,382,285 A | * | 6/1921 | Harris | 123/556 |
| 1,874,002 A | * | 8/1932 | Fantz | 239/403 |
| 1,885,559 A | * | 11/1932 | Smith | 48/189.4 |
| 3,326,538 A | | 6/1967 | Merritt | |
| 3,334,657 A | | 8/1967 | Smith et al. | |
| 3,336,017 A | | 8/1967 | Kopa | |
| 3,388,868 A | | 6/1968 | Watson et al. | |
| 3,393,984 A | | 7/1968 | Wisman | |
| 3,544,290 A | | 12/1970 | Larson, Sr. et al. | |
| 3,664,818 A | * | 5/1972 | Kramer | 48/180.1 |
| 3,981,946 A | | 9/1976 | Soya et al. | |
| 4,044,077 A | * | 8/1977 | Gupta | 261/23.2 |
| 4,092,966 A | * | 6/1978 | Prosen | 48/189.4 |
| 4,106,459 A | | 8/1978 | Asai et al. | |

(Continued)

FOREIGN PATENT DOCUMENTS

GB 2083554 3/1982

*Primary Examiner*—Richard L. Chiesa
(74) *Attorney, Agent, or Firm*—Mark Clodfelter

(57) ABSTRACT

A fuel processing device (2) is provided that produces fuel aerosol particles (5) that when mixed with combustion air, reduces or eliminates detonation (knock) in internal combustion engines, reducing fuel octane requirements and improving burning characteristics of the fuel. The device includes an adapter (10) between fuel injector (12) and port (14) for the fuel injector, the adapter being of a hollow cylindrical configuration. A plurality of plates (46) are disposed in the adapter, plates (46) provided with a central opening (50), with radially extending slots (52) extending away from the central opening (50). Each slot has one edge configured with a vane (56) that creates turbulence in the air/fuel mix passing through the adapter so that larger droplets are broken up into smaller droplets until an optimum droplet size is reached.

36 Claims, 5 Drawing Sheets

U.S. PATENT DOCUMENTS

Figure 1:
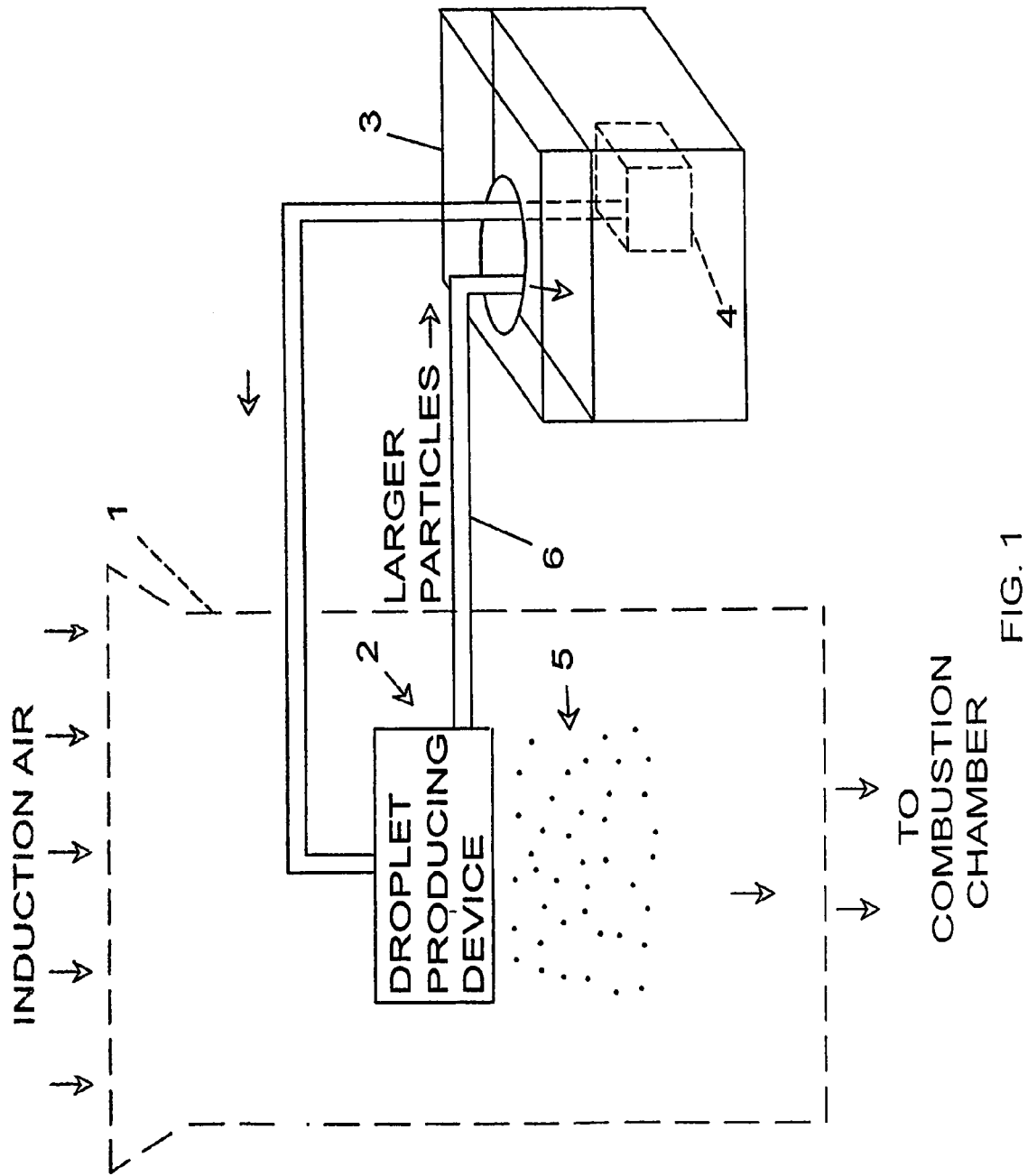

| | | | |
|---|---|---|---|
| 4,123,481 A | 10/1978 | Herold et al. | |
| 4,176,634 A | 12/1979 | Martin | |
| 4,177,780 A * | 12/1979 | Pellerin | 123/590 |
| 4,244,821 A | 1/1981 | Molvar | |
| 4,307,697 A * | 12/1981 | Ong | 48/189.4 |
| 4,359,997 A * | 11/1982 | Lyssy | 123/592 |
| 4,370,304 A | 1/1983 | Hendriks et al. | |
| 4,399,794 A | 8/1983 | Gagnon | |
| 4,443,335 A | 4/1984 | Gullace | |
| 4,487,553 A | 12/1984 | Nagata | |
| 4,515,734 A | 5/1985 | Rock et al. | |
| 4,568,500 A | 2/1986 | Rock et al. | |
| 5,054,688 A | 10/1991 | Grindley | |
| 5,113,945 A | 5/1992 | Cable | |
| 5,472,645 A | 12/1995 | Rock et al. | |
| 5,480,589 A | 1/1996 | Belser et al. | |
| 5,512,216 A | 4/1996 | Rock et al. | |
| 5,672,187 A | 9/1997 | Rock et al. | |
| 6,010,083 A | 1/2000 | Roe et al. | |
| 6,113,078 A | 9/2000 | Rock | |
| 6,283,460 B1 | 9/2001 | Omarsson | |
| 6,540,210 B1 * | 4/2003 | Satterfield | 261/62 |
| 6,736,376 B1 * | 5/2004 | DeLisle | 261/79.1 |

\* cited by examiner

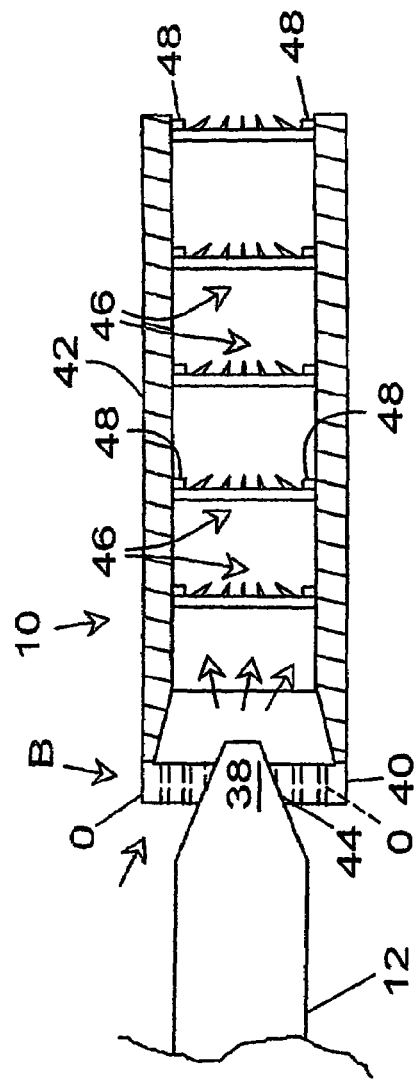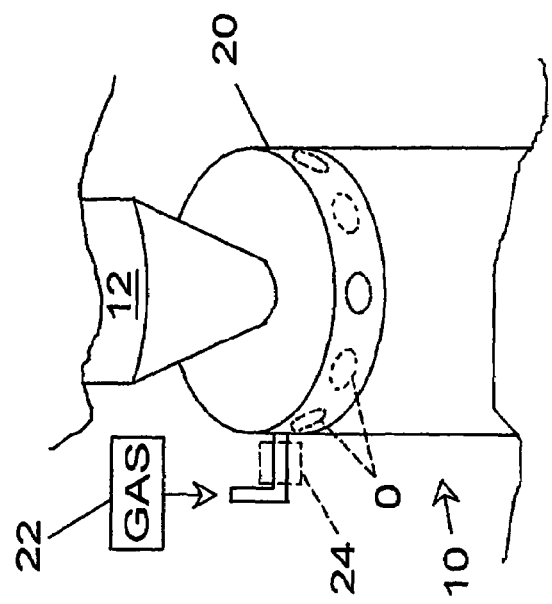

ANTI-DETONATION FUEL DELIVERY SYSTEM

CROSS REFERENCE TO RELATED APPLICATIONS

This application claims priority from PCT application number PCT/US03/08635, filed 19 Mar. 2003, which in turn claims-priority from U.S. patent application Ser. No. 10/101,250, filed 19 Mar. 2002, now U.S. Pat. No. 6,736,376, issued May 18, 2004.

FIELD OF THE INVENTION

This invention relates to internal combustion fuel systems, and particularly to such a system wherein an atomizing device communicating with an interior of an intake manifold or throttle body serves to aerosolize the fuel so that droplet size of the fuel is within predefined limits, allowing the engine to operate with a higher compression ratio and/or a lower octane rating.

BACKGROUND OF THE INVENTION

A large number of methods for producing fuel-air mixtures for reciprocating internal combustion engines are known, and many are patented. As far as Applicant is aware, previously disclosed methods all attempt to produce a fuel vapor mixed thoroughly with air. In many of these methods, fuel is heated, some instances to approximately a boiling point of the fuel, in order to convert the fuel to a gas prior to its induction into a combustion chamber. Virtually all attempt to minimize fuel droplet size based on the belief that fuel droplets in the fuel/air mixture cause inefficient combustion and generate more pollutants in the exhaust.

However, providing a stoichiometric fuel/air mixture wherein the fuel is in a vapor form also provides a readily explosive mixture. This becomes a problem when loading on an engine causes pressure increases in combustion chambers thereof sufficient to raise a temperature of the fuel/air mixture to or beyond its ignition point. This in turn causes the fuel/air mixture to explode all at once (rather than burning evenly in an outward direction from the spark plug), a condition commonly known as "knock" due to the knocking noise created, as bearings of the rotating parts of the engine are slammed together under the force of the explosion. As might be imagined, such a condition is deleterious to bearings and other parts of the engine, and greatly shortens engine life.

In accordance with the present invention (referred to in one embodiment hereinafter as "Star Tube"), an apparatus and process of fluid fuel treatment is provided, the process converting fuel into an aerosol having droplets of a predetermined maximum size with a minimum of vapor being generated in the induction air stream. The object of this invention is to allow internal combustion engines such as Otto-cycle engines, two-stroke engines, Wankel-type engines and other such engines that compress a fuel/air mixture just prior to sparked ignition to operate on a fuel-air mixture that is stoichiometrically correct without detonation, thus reducing fuel octane requirements for engines of a given compression ratio. This is achieved because fuel droplets "burn" at a slower rate than a gas/air mixture which explodes, thus reducing the tendency of an engine to knock. Here, it is believed that a fuel droplet within the aforementioned range burns in layers, so that as an outer layer of the fuel droplet is burned off, oxygen is temporarily depleted around the droplet. Oxygen then surrounds the droplet as combustion gases around the droplet expand and dissipate, allowing the next layer to burn off. This process is repeated until the fuel droplet is fully burned.

Engines such as diesel or other direct injection engines may also benefit from having the fuel particle size such that an even burn occurs although there is generally no knock problem with such engines.

It may also be possible that since, in the instant invention, fuel is initially sprayed into a generally confined tube, vapor saturation within the tube prevents further evaporation of the fuel droplets, causing the fuel droplets to be reduced in size mechanically rather than by evaporation as they travel to the combustion chamber. Here, as the fuel is sprayed into the tube, lighter, more volatile components of the fuel instantly evaporate and increase hydrocarbon vapor pressure within the tube, suppressing evaporation of the heavier hydrocarbon components in the droplets. The heavier-component fuel droplets are processed mechanically by the Star Tube until they reach a size sufficiently small so as to travel with a localized region of lighter-component fuel-saturated air into the combustion chamber.

In accordance with the foregoing, it is one object of the invention to provide apparatus for decreasing or eliminating engine knock and improving combustion by aerosolizing fuel into droplets of a predetermined size. It is another object of the invention to provide apparatus for generating a fuel/air mixture wherein the fuel is incorporated into the droplets to as great an extent as possible, with as little vapor as possible. It is yet another object of the invention to enable an internal combustion, spark ignition engine to operate normally without knock using a fuel of a lower octane rating than the engine is rated for. Other objects of the invention will become apparent upon a reading of the following appended specification.

BRIEF DESCRIPTION OF THE DRAWINGS

FIG. 1 is a diagrammatic view of the broadest concept of the invention wherein a variety of devices may be used as one component of the system.

FIG. 1*a* is a diagrammatic view of a particular anti-detonation fuel delivery system of the present invention.

FIG. 1*b* is a diagrammatic view showing particulars of construction related to another embodiment of the present invention.

FIG. 2 is a cut-away view of the embodiment shown in FIG. 1*a*.

FIG. 2*a* is an end view of the embodiment shown in FIG. 1*a*.

FIG. 2*b* is a cut-away view showing particulars of construction of another embodiment of the invention.

FIG. 3 is a top view of a star spin-and-shear plate of the embodiment of FIG. 1*a*.

FIG. 4 is a side view of the Star Spin-and-Shear-Plate of the embodiment of FIG. 1*a*.

FIG. 5 is a cut-away view of a star spin-and-shear plate illustrating particulars of operation.

FIG. 6 is a cut-away, diagrammatic view of a cylinder and combustion chamber of a Diesel engine fitted with a Star Tube of the instant invention.

DETAILED DESCRIPTION OF THE DRAWINGS

The basic principle of operation of the present invention involves providing a fuel spray having droplets of a predetermined size, generally from about 50 microns or so down to just larger than sub-micron clumps of fuel generally considered to be vapor. In a broadest concept of the invention, and as shown in FIG. 1, a throttle body or intake manifold 1 is provided with any device 2 capable of receiving liquid fuel from a fuel tank 3 and associated fuel pump 4 and converting it into droplets 5 of the described size and providing the droplets to an induction airflow of an internal combustion engine. Droplets that are too large, and to any extent possible fuel vapor, are returned to tank 3 via line six.

Oversize droplets can be isolated by centrifugal force in a vortex or controlled path, or screens can be used to trap oversized particles.

Pursuant thereto, devices such as piezoelectric atomizers, ceramic sieves receiving pressurized fuel, specialized nozzles such as SIMPLEX™ nozzles and LASKIN™ nozzles, air pressure atomizers, rotary cup atomizers, inkjet-like devices that operate using inkjet or bubble jet technologies, insecticide spray nozzles and other nozzles such as SPRAYTRON™-type nozzles available from CHARGED INJECTION CORPORATION of New Jersey may be incorporated into a throttle body or intake manifold. In addition, devices such as the NEBUROTOR™ available from IGEBA GERAETEBAU CORPORATION of Germany. This device uses a motor-driven rotating blade to break the liquid fuel into droplets of the desired size.

In one particular embodiment of the instant invention, part of the normal airflow through the intake manifold is diverted and utilized to process fuel sprayed by one or more fuel injectors into droplets of a predetermined size. This embodiment uses a series of vanes angularly positioned to spin the diverted induction air flow and fuel droplets, forcing the air and fuel droplets in a flow path through slits that are formed by the vanes. The vanes also create turbulence in the flow path, causing mechanical breakup of the fuel into smaller droplets. Within these combined actions, the spiral path creates centrifugal force on the fuel droplets that tend to tear the droplets apart, and the turbulence helps to shear apart oversized particles. As the droplets become successively smaller as they pass through the Star Tube, it is believed that the centrifugal and shearing forces overcome surface tension in the liquid fuel droplets until an equilibrium point between the centrifugal and shearing forces and the surface tension of the droplet is reached. Also, as the particle sizes approach the desired upper limits, spin along the axis of the Star Tube causes particles that are still above the desired size to drift outward from centrifugal force into narrower regions of successive vanes for more processing, while allowing correctly sized particles to flow generally near or through central openings along the axis of the Star Tube. After exiting the Star Tube, the resulting aerosol is mixed with the rest of the induction air stream and the fuel-air mixture is drawn into a combustion chamber.

The method described herein creates a fuel-air mixture that allows a fuel with a lower octane rating to be used without knock in a higher compression spark ignition engine than would otherwise be the case. As stated, many combinations and permutations of various devices and methods for producing aerosols with approximately the same droplet size may be utilized. Through extensive experimentation, Applicant has discovered that when an aerosolized fuel with properly sized droplets is used in an internal combustion spark ignited engine, the aerosolized fuel has less of a tendency to cause the engine to knock. In the instant invention, it is believed the extent to which knocking of an engine is reduced is dependant on how well fuel particle size is controlled. Fuel particles that are too large will not burn completely, causing loss of power and unburned hydrocarbons in the exhaust gas. On the other hand, if the droplets are too small and too much vapor is developed in the aerosolization process, the smaller droplets and vapor may spontaneously detonate (knock) due to increased engine compression as the engine is loaded or if the compression ratio of the engine is too high for the octane rating of the fuel. Empirically derived results have demonstrated that a generally desired particle size range is less than 50 microns or so in diameter and larger than the sub-micron clumps of molecules that are generally considered to be vapor. Within this range, a droplet size of about 20 microns or so appears to be optimal. Above a droplet size of about 50 microns, power begins to drop off and unburned hydrocarbon levels began to increase in the exhaust gases. In an engine where exhaust gases are closely monitored by an engine controller, these unburned hydrocarbons could cause the engine controller to reduce fuel in the fuel-air mixture, creating a situation where the engine is not producing rated power.

Figure 1A:
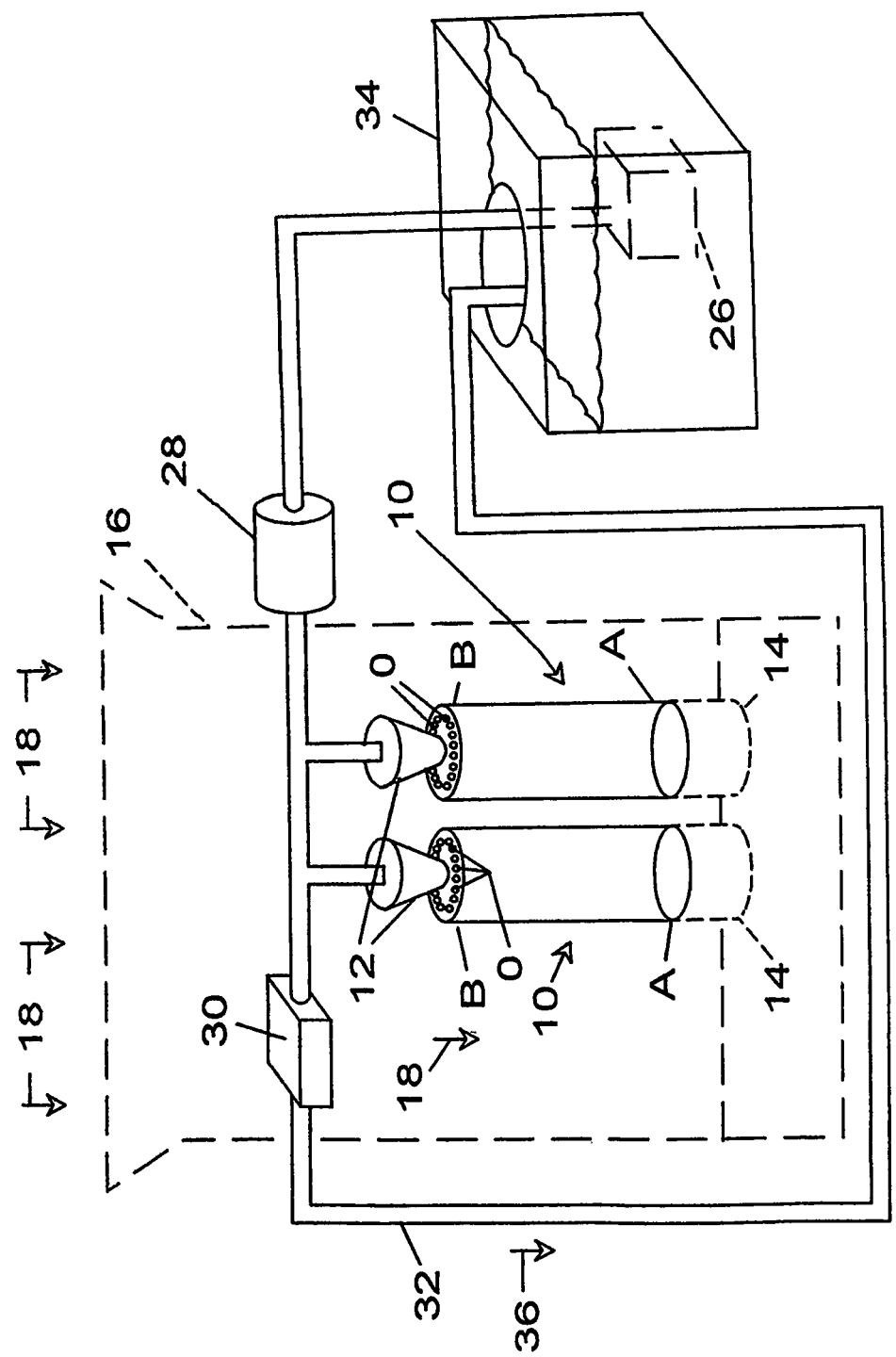

As described herein, FIG. 1a illustrates, by way of example, one possible embodiment of a Star Tube adapter 10 which may be mounted between a conventional fuel injector 12 and an injection port 14 in a throttle body 16 (dashed lines) or in an intake manifold of an internal combustion engine. Conventionally, a fuel injector 10 is fitted to injection port 14 so as to provide a spray of fuel to induction air, as indicated by arrow 18, flowing through the throttle body and intake manifold. As shown, one end B of Star Tube adapter 10 is configured to receive the injection end of a fuel injector 12, with the other end A of the fuel injector configured so as to be mountable in a fuel injection port 14 that otherwise would receive the fuel injector. In some currently manufactured engines, there is more than 1 fuel injector in respective ports in the throttle body that provide fuel to all the cylinders of the engine, thus there is a Star Tube for each respective injector. A portion of the induction air 18 flowing through the throttle body (or intake manifold) 16 enters openings O in end B of the Star Tubes to create turbulence in order to break up the fuel droplets. In other engines where there is a fuel injector and corresponding injection port for each combustion chamber, these ports are typically located in the intake manifold proximate to a respective intake port or valve, with the fuel injector body mounted outside the intake manifold. Here, and as stated, the Star Tube may be configured at this end A to fit the injection port, as by being of a reduced diameter, and be configured at the other end B as an injection port so as to receive the injecting end of a fuel injector. In this instance, a portion of the induction air may be routed or directed to the Star Tube so as to create a motive airflow therethrough, or a carrier gas may be provided independently of the induction airflow. This carrier gas may be an inert gas such as dry nitrogen or filtered atmosphere gasses, or a combustible gas such as propane or butane. Where propane or butane is used, an octane rating of fuels having a lower octane rating is beneficially increased due to the higher octane rating of propane and butane. In addition, the carrier gas may be or include an oxidizing gas such as nitrous oxide, which may be supplied through the Star Tubes in a quantity or proportion commensurate with its use as a racing additive. In this instance, the motive flow of gas through the Star Tube may be switched between another gas that may or may not be combustible and the nitrous oxide. In addition, other gasses that raise octane rating of the fuel, provide anti-pollution qualities, increase power output of the engine or increase surface tension of the fuel droplets may also be used, either alone or in combination. Further, vapors from liquids may also be used, such as alcohol. Thus, it should be apparent that any gas or vapor or combination thereof may be used for generating a gaseous flow through the Star Tubes, this flow being of a sufficiently high rate so as to generate turbulence to mechanically break the fuel droplets into smaller droplets having a size within the predetermined range as described above.

As shown in FIG. 1b, a supply of gas may be coupled to the Star Tubes by an annular hollow collar 20 open on a bottom side next to openings O in the end of the Star Tubes, and fitted to a top of the Star Tubes. Injectors 12 fit in the opening of the annular collar and communicate with an interior of the Star Tube assembly. The supply of gas 22 is provided to collar 20, and may be valved by a valve 24 (dashed lines) operable to release a burst of gas in conjunction with the fuel injector being energized to release a spray of fuel. In other instances, the gas would simply flow continuously. In another embodiment, Star Tubes 10 may simply be closed at a top and except for a port for the fuel injector, with gas 22 being supplied directly to the Star Tubes. In all instances where needed, the Star Tube and fuel injector are conventionally mounted and supported by brackets or similar structure (dashed lines in FIG. 1a), as should be apparent to one skilled in the art.

As many modern engines test exhaust gas products to determine quantity of fuel to be provided to the induction air, addition of any of the aforementioned gasses or vapors to induction air would be compensated for by the engine controller in order to keep the fuel/air mixture at a stoichiometric proportion. Further, in the instance where there is a fuel injector for each combustion chamber, an aftermarket or OEM manifold may be provided with provisions to house the fuel injectors and Star Tubes in a position proximate a respective intake port of a combustion chamber, with possibly an air scoop or independent channel cast or mounted in the interior of the intake manifold to direct an appropriate proportion of induction air through the Star Tubes. Alternately, an amount of gas or vapor flowing through the Star Tubes may be controlled, as by a computer such as an engine controller, to maintain or assist in maintaining a stoichiometric fuel/air mixture or to increase or decrease a flow of motive gas through the Star Tube to compensate for changes in induction airflow, as when the accelerator pedal is depressed to a greater or lesser degree. Alternately, mechanical linkages coupled to valving apparatus may be employed for such increases and decreases in the motive flow through the Star Tubes.

With reference again to FIG. 1a, and as described, a Star Tube 10 may be mounted in the throttle body or intake manifold 16 between a respective fuel injector and an associated injection port. Typically, the liquid fuel is pumped by a low pressure fuel pump 26 in a fuel tank to a high pressure fuel pump 28, which conventionally develops fuel flow as shown to the fuel injectors 12. Injectors 12 produce pulsed sprays of aerosol fuel as controlled by an engine controller (not shown), which determines both quantity and timing of the sprays. These sprays of aerosol fuel from the fuel injectors 12 are fed directly into Star Tubes 10 where the spray is processed into smaller droplets of 50 microns or less in diameter, and subsequently fed into the throttle body, intake manifold or any other regions in which fuel would be appropriately injected. Induction air and the fuel aerosol as processed by the Star Tubes is then drawn into a combustion chamber (not shown). The fuel feeding the fuel injectors may be conventionally regulated to a constant pressure by fuel pressure regulator 30, which relieves excess pressure by bleeding high pressure fuel via return line 32 to fuel tank 34 as shown by arrow 36, along with any vapor that has formed within the high pressure feed line. Of course, any of the devices shown and described for FIG. 1 may be substituted for the Star Tubes 10.

Figure 2A:
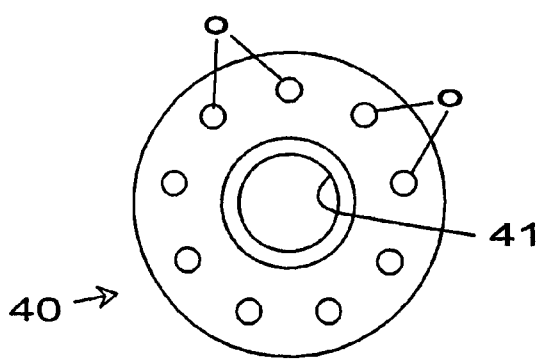
Figure 2B:
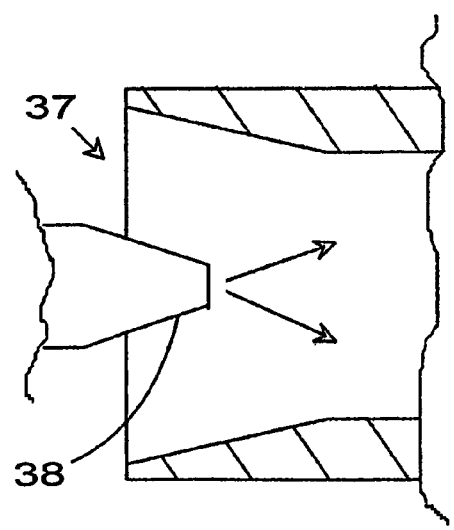

FIG. 2 shows a cross section of one of Star Tubes 10. Initially, at an end B of the Star Tube that receives an injection end 38 of a fuel injector, a cap, as shown enlarged in FIG. 2a, or other closure 40 may be configured with an opening 41 which may be tapered to match a taper of fuel injection end 38. Positioned in cap 40 around injection end 38 is a plurality (9 shown) of openings O, which may be sized to handle air flow through the Star Tube for a particular engine. In the example of FIG. 2, a Star Tube constructed for use in a 350 cubic inch displacement engine is shown. In a popular, conventional version of this particular engine, there are four fuel injectors mounted in ports positioned directly in the airflow of a throttle body of the engine, with the fuel injector and Star Tube mounted and supported by brackets (schematically illustrated by dashed lines). As such, a Star Tube is mounted between each port and a respective fuel injector. While a plurality of openings O are disclosed, other sizes and types of openings are also workable. For instance, as shown in FIG. 2b, a single, annular opening 37 around end 38 of fuel injector 12 may be provided, possibly out to the inner diameter of the Star Tube, or a smaller number of larger openings O may be constructed in end B of the Star Tubes. In addition, and as stated, valves coupled to openings O or a single valve coupled to the end of the Star Tube may be used to release a burst of gas or vapor in conjunction with injector 12 being energized to release a spray of fuel. As described above, a most significant feature of the Star Tubes and gas flow therethrough is that the fuel droplets are broken up into droplets smaller than about 50 microns or so. In addition, formation of droplets by the Star Tubes tends to minimize fuel vapor formation in the induction airflow.

As stated, a Star Tube that has been found to work well for the 350 cubic inch engine is shown in FIG. 2. In this embodiment, the tube portion 42 is about 1.5 inches outside diameter and about 1 inch inside diameter. Cap 40 is provided with a plurality (9 shown) of openings O around a periphery of the cap, these openings O each being about 0.187 inch in diameter. A central opening 44 in cap 40 is about 0.5 inch in diameter to receive the fuel injector end 38. In the instance where there is simply an annular opening around end 38 of the fuel injector in cap 40 or where cap 40 is omitted entirely, the injector body would be supported exterior of the Star Tube so that end 38 is generally coaxially positioned with respect to the end of the Star Tube, forming an annular opening around the injector end 38.

The region of the tube portion 42 immediately adjacent cap 40, which may be about 0.250 inches thick, is tapered on an interior side over about a 0.5 inch length of the tube portion as shown in order to provide a clearance for openings O, which may be located around a periphery of cap 40 and to provide a feeder region for fuel spray from the injector. Additionally, this taper may somewhat compress air flowing through openings O, advantageously speeding up velocity of air flowing through the Star Tube. Alternately, the Star Tube may be constructed of thinner material. As such, the spray of fuel from the fuel injector is initially introduced into the Star Tube along with a flow of gas. The flow of gas and fuel droplet spray then encounters a plurality (5 shown) of serially arranged Star-Spin-and-Shear-Plates 46 spaced about 0.75 inch from one another, with the closest star plate to the injector being spaced about 0.75 inch from the interior transition of the taper. The star spin-and-shear plates may be mounted in the tube as by an interference fit between edges of each plate and an interior of a tube, by lips or supports constructed along an interior surface of the tube that the plates rest on, by bonding the plates within the tube, securing by fasteners, or any other obvious means for securing the plates within the tube, as represented by blocks 48 in FIG. 2. Further, in the event a plate inadvertently loosens within a Star Tube, an end of the Star Tube closest to a respective intake manifold port or throttle body port may be slightly narrowed or otherwise constructed so that the star spin-and-shear plate is not drawn into the intake manifold where it could impact a valve or enter a combustion chamber.

Figure 3:
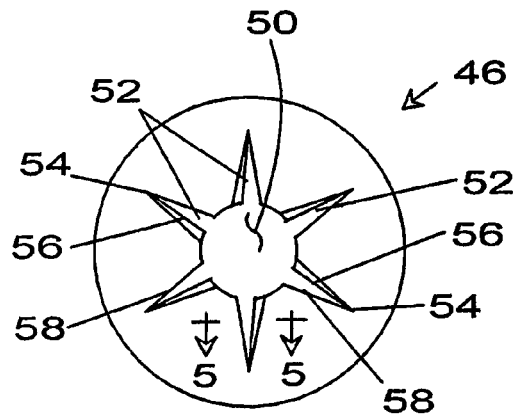

The Star spin-and-shear plates 46 each have a plurality of types of openings (FIG. 3), these openings being a central opening 50 of about 0.5 inches in diameter and a plurality, in this instance 6, of narrowing spoke-like openings or slits 52 communicating with and radially extending from central opening 50. As shown in FIG. 3, openings 52 may be initially relatively wide at central opening 50, and angularly converge to a point 54 radially positioned at approximately 50 percent to 85 percent or so of a diameter of the plates 46. A ratio of the diameter of plate 46 with respect to central opening 50 may be about 3 to 1, but a range of about 1.5 to 1 or so up to about 5 to 1 has been discovered to be workable.

Figure 4:
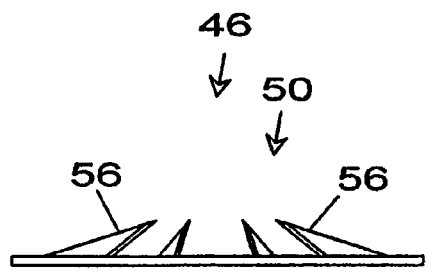
Figure 5:
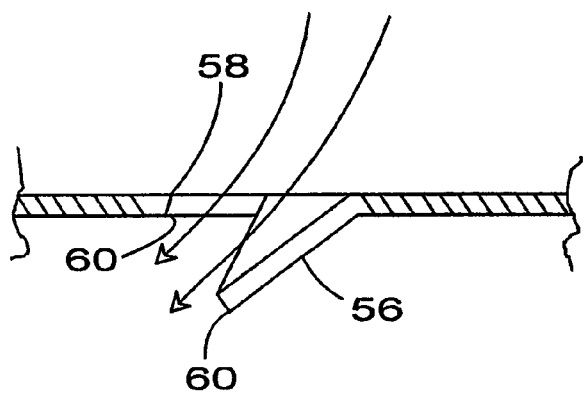

As a feature of the invention, FIGS. 3–5 also illustrate a downwardly depending vane 56 positioned on edges of each of openings 52. Vanes 56 may be downwardly angled, as shown in FIGS. 4 and 5, at about from a few degrees to almost 90 degrees from a plane of the plate. However, in one contemplated embodiment that works well, a vane angle of about 40 degrees is used. Vanes 56, in conjunction with an opposed edge 58 of openings 52, serve to provide edges 60 (FIG. 5) that create turbulence when the airflow passes through a respective opening 52. This turbulence shears and breaks up larger fuel droplets into smaller droplets as the flow passes through successive star plates 46 until a desired droplet size of about 50 microns is reached. In addition, since all vanes 56 may be oriented to direct airflow in the same direction, a net spin of the aerosol mix through the Star Tube may be provided (clockwise in FIG. 3), causing larger fuel droplets to drift outward due to centrifugal force toward a perimeter of the Star Tube, where they are forced to pass through a narrower portion of openings 52 where turbulence through the narrower opening is greater. Here, this greater turbulence developed by the narrower regions of openings 52, in combination with sharp or abrupt edges 60, causes the larger droplets to be broken up into smaller droplets. As such, smaller fuel droplets that are not as greatly affected by centrifugal force are prone to pass through portions of openings 52 closer to, or through central openings 50.

In addition, it has been found that the vanes may be angled either upward or downward, with approximately equal performance with respect to breaking up larger droplets into smaller droplets. Here, while the rotation imparted by downwardly extending vanes causes axial spin of fuel/air mixture through the Star Tube, upwardly extending vanes also creates spin through the Star Tube, in addition to the aforementioned shearing action around edges of openings 52.

While a star shear-and-spin plate is disclosed, other configurations of plates with openings therein have been tested and have been found to work, albeit to a lesser extent but to an extent which may be practical. For instance, in one test the star shear-and-spin plates were replaced with conventional flat washers. In this example, spin of the airflow was eliminated while providing relatively sharp or abrupt edges around central openings in the washers that developed turbulence. This embodiment worked about 40% as well as the star shear-and-spin plates having radially extending slits. From this, it should be apparent that openings of any configuration in the plates may be used. This would include star-shaped openings, rectangular openings, square openings, or any other opening configuration. In addition these openings may be alternated between successive plates so that a first plate may have one particularly configured opening and the next plate may have a differently configured opening, and so forth.

At an opposite end of the Star Tube (the tube configured at this opposite end to be fitted into a fuel injector port of an intake manifold or throttle body) the processed fuel/air mixture is drawn into a throttle body or intake manifold, where the processed fuel aerosol particles suspended in the carrier air flowing through the Star Tube are mixed with induction air flowing through the throttle body or intake manifold and subsequently drawn into a combustion chamber.

While 6 spoke-like openings 52 are shown, more or fewer of these openings 52, such as about three or so or more, may be used. Likewise, while 5 star plates are shown, fewer or more of these plates may be used, such as from about 1 to 7 or so. Also, the Star Tubes, star spin-and-shear plates and openings in the star plates may be scaled as necessary depending on displacement of the engine and number of Star Tubes per cylinder.

As a primary function of a fuel injector is to provide a selected amount of fuel as determined by an engine controller, the fuel injector simply serves as a variable valving device responsive to the engine controller. As such, it may be possible to replace the fuel injector with a valve that provides the required amount of fuel to a Star Tube or any device as described for FIG. 1 responsive to signal from an engine controller, with the Star Tube or other device breaking up the fuel into droplets of the predetermined size of about 50 microns or so. In addition, the Star Tube may use a series of horizontal vanes to spin the air and fuel mixture through the Star Tube, forcing the larger fuel droplets to drift outward and pass through narrower portions of the horizontal slits that are formed by the vanes, in turn causing their mechanical breakup into smaller droplets. In this embodiment, the mixture also has induced spin around the axis of the Star Tube as well as turbulent spin from passing through the slits. The combined spins create centrifugal forces, that in combination with shearing edges, tend to tear the larger droplets apart.

As the droplets get successively smaller, it is believed that centrifugal and shearing forces overcome the surface tension in the liquid droplet down to an equilibrium point where the droplets cannot be further reduced, which as stated is from about 50 microns down to sub-micron clumps just larger than vapor. The resulting aerosol is then recombined with the rest of the induction air, with the carrier air passing through all the Star Tubes of an engine being up to about 5% or so of the total induction air flow through the throttle body or intake manifold. The process of breaking up the larger droplets may further be assisted or regulated by additives in the fuel to limit breakup beyond a selected smallest size, such as 1–10 microns or so. Here, the additive may be selected so as to increase surface tension in the fuel droplets so that the smallest droplets do not break up into yet smaller droplets that may evaporate into vapor. For instance, the addition of a small amount of heavier oil or a fuel oil to gasoline, or addition of a small amount of glycerin or castor oil to alcohol, may increase surface tension or reduce volatility of the fuel so as to facilitate droplet formation and minimize vapor formation.

Several test engines have been adapted with Applicant's invention in order to test feasibility, practicality and workability of the Star Tubes. For instance, one such engine was adapted as described above, and performed as follows:

Engine:

A Chevrolet 350 CID engine bored out 0.030 to provide about 355 CID and a Compression Ratio of about 10.6:1.

Total runs done: more than 160.

Star Tubes: (Step Diffuser enhanced by Star spin)

Six Star-spoked openings, base to base: ¾ in.

Peak anti-detonation effect in this engine was found with 5 to 7 Star steps. With more than 7 steps, power began to drop, probably because of fuel restriction. With 3 star plates, the effect was still about 80% of what it was with 5 star plates. In this engine;

Star plate OD: 15/16 in.

Tube ID: 13/16 in.

Tube OD: 1¼ in.

Smaller sized star plates and tubes still produced an effect but with a proportional reduction in engine power. Sizing of the Star plates may therefore be a function of airflow (almost akin to engine size) through the engine. Considerable latitude appears to exist, but larger area star plates work better with larger displacement engines, and smaller area star plates work better with smaller displacement engines. As a general rule, the Star Tubes work well when they receive about 5% of the total induction airflow through the intake manifold or throttle body. The opening or openings in cap 12 around the fuel injector tip are generally sized to allow little or no restriction of gas flow through the tube.

Typically, engine runs were from 5000 rpm down to 2500 rpm, with data readings taken by conventional engine monitoring equipment. Particle size was measured by a test rig wherein a Star Tube and associated fuel injector was set up in a simulated throttle body constructed of a transparent material. An air compressor or fan was used to draw air through the simulated throttle body at speeds simulating induction airflow. Conventional laser interferometry equipment, such as that used to measure size of pesticide droplets, was used to measure the fuel droplets size just after the Star Tube. Engine measurements were taken at every 250 rpm from between 1500 rpm up to about 4500 rpm. Critical detonation data typically comes in between 3500 and 2800 rpm. Peak torque typically comes in between 3000 and 4000 rpm. Spark advance was set for best torque (without detonation, if any). With C-12 (108 octane racing fuel), there was never any detonation regardless of the amount of spark advance (this did not exceed 36 degrees). Using a gasoline with an octane rating of about 80, peak torque with the Star Tubes was typically at about 28 to 30 degrees spark advance. This was always equal to or better than peak torque with C-12. The runs with C-12 runs were used to establish a baseline.

The Star Tube of the instant invention may also work with certain Diesel or Diesel-type engines wherein the fuel is injected after the compression and is ignited by compression. In this instance, and referring to FIG. 6, a cut-away, diagrammatic view of a Diesel cylinder and combustion chamber 60 is shown. In this particular type of Diesel engine, a swirl chamber 62 is conventionally provided in a head portion 64 of the combustion chamber, and a swirl cutout 66 is conventionally provided in a piston 68. A passageway 70 commnicates between swirl chamber 62 and a combustion chamber 72. A fuel injector 74 is mounted so as to inject fuel into swirl chamber 62, with a Star Tube 76 of the present invention mounted in passageway 70 so as to receive fuel from injector 74 and convey fuel droplets to combustion chamber 72. It is to be noted that the Star Tube 76 is sized so as not to completely fill passageway 70, thus allowing some of the combustion air to bypass Star Tube 76.

Figure 6:
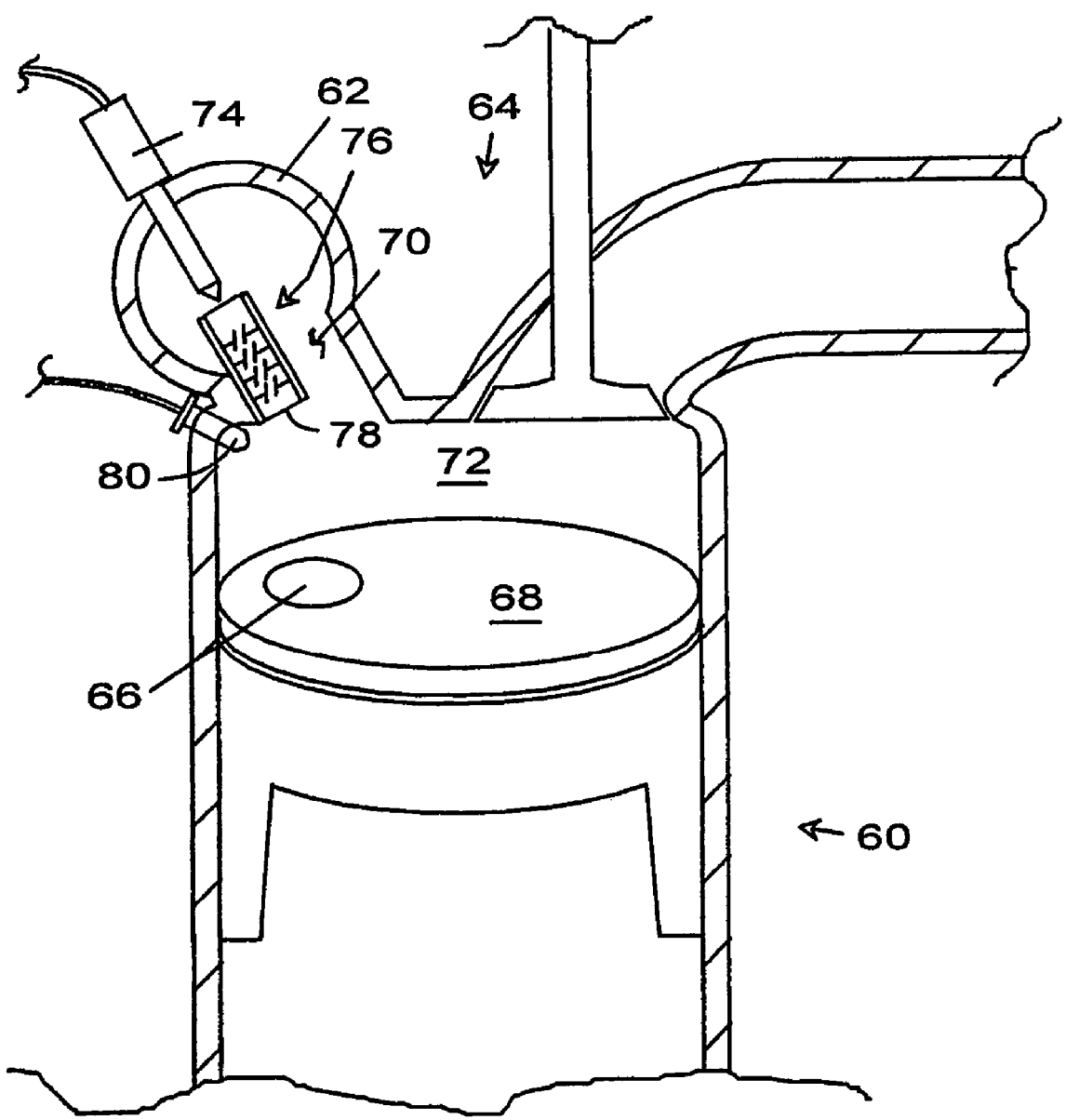

Operation of the embodiment of FIG. 6 is as follows. During the compression stroke, essentially all of the combustion air is compressed into the swirl chamber. At the appropriate time, which is typically 2 degrees or so before top dead center for a Diesel engine, fuel is injected into the Star Tube. At the beginning of the fuel injection, it is believed a small combustion burn occurs in the Star Tube, depleting the tube of oxygen and allowing the remainder of the fuel droplets to be sprayed into the Star Tube. The remainder of the fuel droplets are processed by the Star Tube as described abovee by combustion products of this small burn and are ejected from the Star Tube. The processed droplets are ejected from the Star Tube and mixed with air bypassing the Star Tube via passageway 70. When cold, the engine may be started by means of a conventional glow plug 80 positioned below Star Tube 76.

Having thus described my invention and the manner of its use, it should be apparent to those skilled in the art that incidental changes may be made thereto that fairly fall within the scope of the following appended claims.

I claim:

1. A method for providing an air/fuel mixture for use in an internal combustion engine, said air/fuel mixture predominantly containing size-limited fuel droplets having a maximum predetermined size, the method comprising the steps of:
    a) providing a discrete, constrained flow path separate from an induction airflow path of said internal combustion engine,
    b) providing at least one turbulence-inducing device configured for producing said fuel droplets of said maximum predetermined size with a minimum of fuel vapor in said constrained flow path,
    c) introducing a flow of gas into said constrained flow path,
    d) injecting a liquid fuel into said constrained flow path so that said liquid fuel is broken up by turbulence into fuel droplets of said maximum predetermined size,
    e) mixing said gas and said fuel droplets of said maximum predetermined size with induction air flow in said induction airflow path for burning in combustion chambers of said internal combustion engine,
    whereby said fuel droplets of said maximum predetermined size burn faster, cleaner and with less detonation than said liquid fuel in a vapor form or in a form other than said droplets of said maximum predetermined size.

2. A method as set forth in claim 1 wherein said step of introducing a gas into a constrained flow path further comprises the step of utilizing a small portion of said induction airflow as said flow of gas.

3. A method as set forth in claim 1 wherein said step of providing at least one turbulence-inducing device further comprises the step of spinning said gas and said droplets in said constrained flow path.

4. A method as set forth in claim 1 wherein said step of mixing said gas and fuel droplets further includes the step of mixing said gas and fuel droplets into said induction airflow in a throttle body of said internal combustion engine.

5. A method as set forth in claim 1 wherein said step of mixing said gas and fuel droplets further includes the step of mixing said gas and fuel droplets of a predetermined size with an induction air flow in an intake manifold of said internal combustion engine.

6. A method as set forth in claim 2 further including the step of passing said gas and said fuel droplets over a plurality of edges located in said constrained flow path to develop said turbulence.

7. A method as set forth in claim 6 further comprising the step of angling at least some of said edges so as to direct said fuel droplets and said gas in a spiral through said constrained flow path.

8. A method as set forth in claim 1 wherein said step of introducing a gas into a constrained flow path further comprises the step of introducing a combustible gas in said constrained flow path.

9. A method as set forth in claim 1 wherein said step of introducing a gas into a constrained flow path further includes the step of introducing an oxidizing gas in said constrained flow path.

10. Apparatus for processing a fuel spray for an internal combustion engine comprising:
  a fuel metering valve configured to be fitted in a port in an internal combustion engine, said fuel metering valve responsive to an engine computer to inject bursts of a selected quality of fuel,
  a tubular member configured at a first end to receive said bursts of a selected quality of fuel and configured at an opposite, second end to interface with said port,
  said first end of said tubular member further configured to receive a flow of gas along with said fuel, and
  at least one turbulence-inducing device mounted inside said tubular member, and configured so that said flow of gas and said fuel flows past said turbulence-inducing device, breaking up said fuel into droplets of a maximum predetermined size and smaller with a minimum of fuel vapor being produced, and subsequently mixing said minimum of fuel vapor, said droplets of a maximum predetermined size and smaller and said flow of gas with an induction airflow of said engine.

11. An apparatus as set forth in claim 10 wherein said droplets of a maximum predetermined size and smaller are less than about 50 microns in diameter.

12. An apparatus as set forth in claim 10 wherein said flow of gas is a portion of said induction airflow.

13. An apparatus as set forth in claim 10 wherein said flow of gas is a combustible gas.

14. An apparatus as set forth in claim 10 wherein said flow of gas is a non-combustible gas separate from said induction airflow.

15. An apparatus as set forth in claim 10 wherein said turbulence-inducing device comprises a plate having at least a centrally located opening therein.

16. An apparatus as set forth in claim 15 further comprising a plurality of slits radially extending from said centrally located opening.

17. An apparatus as set forth in claim 16 wherein said slits are wider near said central opening and converge with distance from said central opening.

18. An apparatus as set forth in claim 17 wherein edges of said slits are configured to direct said flow of gas and said droplets in a spiral through said tube.

19. An apparatus for receiving a fuel spray from a fuel injector of an internal combustion engine and reducing droplets of said fuel spray to a size of less than about 50 microns in diameter while producing a minimum of fuel vapor, said apparatus comprising;
  a tube configured at a first end for receiving said fuel injector and configured at a second end to interface with an engine port for receiving said fuel injector,
  a supply of gas provided through said first end of said tube,
  a plurality of turbulence-inducing plates mounted in spaced-apart relation in said tube,
  whereby as said gas flows through said tube, said fuel spray is broken up into said droplets due to turbulence from said turbulence-inducing plates, after which said gas and said droplets are mixed with an induction airflow of said internal combustion engine.

20. An apparatus as set forth in claim 19 wherein said first end of said tube has a cap having a central opening for receiving said fuel injector and a plurality of smaller openings around said central opening for receiving said flow of gas.

21. An apparatus as set forth in claim 19 wherein said first end of said tube comprises an open end, with a fuel injector tip of said fuel injector positioned in said open end.

22. An apparatus as set forth in claim 19 wherein said first end of said tube comprises an annular opening defined by an end of said fuel injector.

23. An apparatus as set forth in claim 19 wherein said plurality of turbulence-inducing plates each comprise a disk mounted in said tube generally perpendicular to an axis of said tube, each said disk having an opening therein.

24. An apparatus as set forth in claim 23 wherein said opening is a circular opening centrally located in said disk.

25. An apparatus as set forth in claim 24 further comprising a plurality of slits extending outward from said circular opening.

26. An apparatus as set forth in claim 25 wherein each slit of said slits is wider at said central opening and becomes narrower with distance away from said circular opening.

27. An apparatus as set forth in claim 25 wherein one side of each of said slits is configured as a vane to direct said gas and said droplets flowing through said tube in a spiral motion.

28. An apparatus as is set forth in claim 19 wherein said gas comprises a portion of said induction airflow.

29. An apparatus as set forth in claim 19 wherein said gas is a combustible gas.

30. An apparatus as set forth in claim 19 wherein said gas is an oxidizing gas.

31. In an internal combustion engine utilizing an induction airflow to mix with and transport fuel to at least one combustion chamber, a method comprising the steps of:
  a) providing a supply of liquid fuel of an octane rating that would otherwise create detonation in said internal combustion engine,
  b) in said induction airflow, breaking up said liquid fuel into fuel droplets of a maximum predetermined size while generating a minimum of fuel vapor,
  c) drawing said induction airflow containing said fuel droplets of a maximum predetermined size into said combustion chamber, where said fuel is burned without detonation.

32. A method as set forth in claim 31 wherein said step of breaking up said liquid fuel into fuel droplets of a maximum predetermined size further comprises the step of breaking up said liquid fuel with a nozzle configured for producing said fuel droplets of a maximum predetermined size.

33. A method as set forth in claim 31 wherein said step of breaking up said liquid fuel into fuel droplets further comprises the step of breaking up said liquid fuel with a piezoelectric atomizer configured for producing said fuel droplets of a maximum predetermined size.

34. A method as set forth in claim 31 wherein said step of breaking up said liquid fuel into fuel droplets further comprises the step of breaking up said liquid fuel with an air pressure atomizer configured for producing said fuel droplets of a maximum predetermined size.

35. A method as set forth in claim 31 wherein said step of breaking up said liquid fuel into fuel droplets further comprises the step of breaking up said liquid fuel with a rotating atomizer configured for producing said fuel droplets of a maximum predetermined size.

36. A method as set forth in claim 35 wherein said step of breaking up said liquid fuel into fuel droplets of a maximum predetermined size further comprises the steps of:

a) providing a selected quantity of said liquid fuel to a constrained flow path separate from a flow path of said induction airflow, b) providing a flow of gas into said constrained flow path, c) in said constrained flow path, passing said flow of gas and said selected quantity of liquid fuel past at least one turbulence-inducing device, breaking up said liquid fuel into said fuel droplets of a maximum predetermined size.

* * * * *